United States Patent [19]

Ichikawa et al.

[11] 4,414,337

[45] Nov. 8, 1983

[54] SHAPED CERAMICS

[75] Inventors: Yoshio Ichikawa, Pittsburgh; George M. Halgas, Monroeville, both of Pa.

[73] Assignee: Westinghouse Electric Corp., Pittsburgh, Pa.

[21] Appl. No.: 379,813

[22] Filed: May 19, 1982

[51] Int. Cl.$^3$ ............................................. C04B 35/48
[52] U.S. Cl. .................................... 501/103; 501/104
[58] Field of Search ......................... 501/104, 105, 103

[56] References Cited

U.S. PATENT DOCUMENTS

| | | | |
|---|---|---|---|
| 3,153,636 | 10/1964 | Shanta et al. | 252/478 |
| 3,261,696 | 7/1966 | Wiegert et al. | 501/84 |
| 3,421,914 | 1/1969 | Hare | 501/80 |
| 3,769,044 | 10/1973 | Horton | 501/104 |
| 3,803,043 | 4/1974 | Magladry et al. | 252/301.1 R |
| 3,963,504 | 6/1976 | Lundsager | 501/82 |
| 4,011,291 | 3/1977 | Curry | 264/43 |
| 4,035,191 | 7/1977 | Johns | 501/104 |
| 4,075,303 | 2/1978 | Yarwood et al. | 264/44 |
| 4,104,345 | 8/1978 | Anderson et al. | 264/43 |
| 4,219,359 | 8/1980 | Miwa et al. | 501/104 |
| 4,221,650 | 9/1980 | Friese et at. | 501/105 |

*Primary Examiner*—James Poer
*Attorney, Agent, or Firm*—R. D. Fuerle

[57] ABSTRACT

A composition is disclosed of about 0.45 to about 5.5 percent of an organic water-soluble binder which has a thermal decomposition temperature of about 100 to about 500° C. and a viscosity of less than about 10,000 poises at 20° C., about 1.5 to about 4.0 percent of a starch which has a thermal decomposition temperature of about 250 to about 535° C. where the thermal decomposition temperature of the binder and the starch are at least about 50° C. apart, about 1.5 to about 3.5 percent cellulose, about 0.5 to about 2.0 percent of a dispersant, and about 7 to about 11 percent water, and about 75 to about 89 percent of a high temperature refractory material such as stabilized zirconia. The composition is de-aired, formed into a shape, and fired to produce a ceramic structure.

27 Claims, 1 Drawing Figure

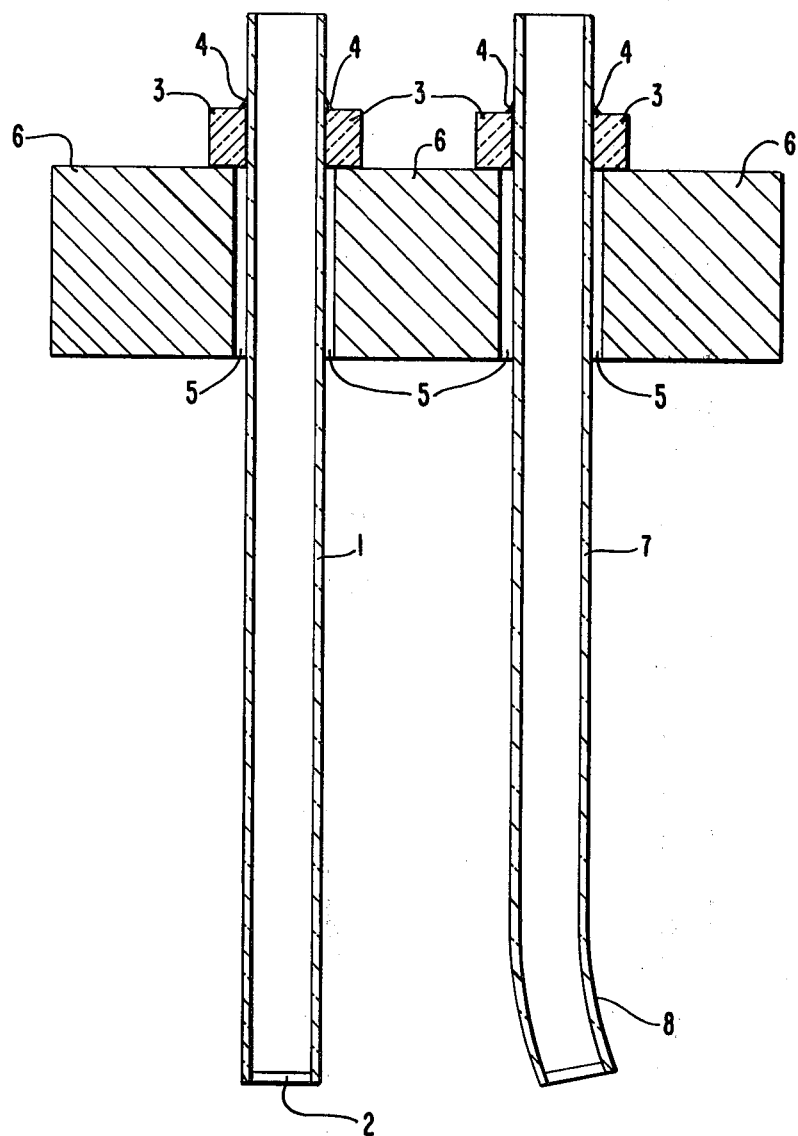

SHAPED CERAMICS

BACKGROUND OF THE INVENTION

While high temperature fuel cells are a very efficient means of generating electricity, it is difficult to find materials which can withstand the extreme conditions encountered in the fuel cell. In particular, tubes of a porous insulating material are required which can withstand temperatures of about 1000° C. Under an older design, these tubes were open at both ends and were made from high temperature refractory materials such as stabilized zirconia. In making the tube, a paste was extruded to form a tube which was hung and fired to produce a ceramic structure. The bottom of these tubes usually curled upward due to stresses induced in the firing. It was impossible to use crooked tubes in the fuel cell because they could not be stacked together so as to achieve uniform electrical contact between them. This was not a problem, however, because the remainder of the tube was straight and the bottom of the tube was simply cut off and discarded.

However, in order to make the fuel cells more efficient, the design of the tubes was changed so that one end of the tube had to be plugged. It was possible to place a plug of unfired paste in one end of a fired tube and refire the tube to fuse the plug to the tube, but this was an expensive procedure. It was not possible to place the plug at the top of the tube because a collar had to be placed around the top of the tube to hang it during firing, and the collar could not be removed without damaging the tube. Of course, if the plug was placed at the bottom of a tube, the tube would still curl and the bottom portion containing the plug would have to be cut off.

SUMMARY OF THE INVENTION

We have discovered how to produce, in a single firing, straight ceramic tubes plugged at one end. We have discovered that if certain changes are made in the composition of the refractory paste, the tubes will not curl during firing.

Ceramic structures produced using the composition of this invention are mechanically strong and of high electrical resistance. Also, their porosity can be controlled by altering the type, quantity, and particle size of different ingredients.

DESCRIPTION OF THE DRAWINGS

The accompanying drawing is a side view in section showing two tubes after firing, one made with a composition prepared according to this invention and one prepared with a previous composition.

In the drawing, a tube 1 made with a composition according to this invention has a plug 2 in one end and a collar 3 around the other end. Paste 4 seals the collar 3 to the tube. The tube extends through aperture 5 of tube holder 6, resting on collar 2. A second tube 7, made with a previous composition, is similarly constructed and hung but curled at one end 8 due to stresses induced during firing.

The composition of this invention consists of about 0.45 to about 5.5 percent (all percentages herein are by weight) organic binder, about 1.5 to about 4.0 percent starch, about 1.5 to about 3.5 percent cellulose, about 0.5 to about 2.0 percent dispersant, about 75 to about 89 percent high temperature refractory material, and about 7 to about 11 percent water. Preferably, the composition consists of about 0.75 to about 4.0 percent organic binder, about 3.0 to about 3.5 percent starch, about 2.0 to about 2.5 percent cellulose, about 0.75 to about 1.5 percent dispersant, about 79 to about 85 percent high temperature refractory material and about 8 to about 10 percent water. Compositions outside these ranges will either produce stressed or warped structures or will lack the strength and porosity that is required for ceramics useful in fuel cells.

The purpose of the organic binder is to add plasticity to the composition. The organic binder should thermally decompose between 100° and 500° C., should be soluble in water, and should have a viscosity of less than 10,000 poises at 20° C. It should also be stable in the composition until the composition is fired. Examples of suitable organic binders include polyvinyl alcohol, polyvinyl acetate and wax emulsions of paraffin, microcrystalline or blend of natural and synthethic waxes. Polyvinyl alcohol is preferred as it gives the composition a better green strength for the quantity used.

The starch is present in the composition to add cohesiveness to it. The starch should preferably have a particle size of less than 200 mesh as larger particle sizes will produce a rough texture on the surface of the resulting ceramic. The starch should thermally decompose between 250° and 535° C., but the binder and the starch should be selected so that their decomposition temperatures are at least 50° apart, and are preferably at least 75° apart. This is important because it lets the organic materials escape gradually from the ceramic structure during firing. If all of the organic materials escaped at the same temperature, the structure might be damaged or destroyed. Examples of suitable starches include cornstarch, rice starch, potato starch, and farina, tapioca, and sago. Cornstarch is preferred as it is less expensive and works well.

Cellulose is added to the composition for strength, porosity control, and cohesiveness. The cellulose should also have a particle size of less than 200 mesh to produce a smooth, textured ceramic. Maple wood flour and native fibers cellulose may be used, but ash-free cellulose is preferred as it does not leave any residuals in the ceramic.

A dispersant is included in the composition for homogeneity and to reduce the amount of water required. The preferred dispersant is ammonia neutralized condensed naphthalene sulfonic acid as it does not increase the electrical conductivity. Other dispersants which may be used include pure lignin sulfates, modified lignosulfates, modified sulfonate, or sulfated oleic acid. Dispersants are electrolyte which repel the particles in the composition producing a more homogeneous composition.

The high temperature refractory material is a compound which produces a metal oxide on firing at temperatures over 1200° C. Examples include stabilized zirconia, aluminum silicates, and magnesium silicates. Stabilized zirconia is preferred as it produces a ceramic having the best properties for fuel cells. The zirconia must be stabilized or it tends to break apart on repeated temperature cycles because it changes phase and the phases have different thermal expansion properties. The zirconia is stabilized by the addition of a stabilizer such as calcia, magnesia, or yttria. Calcia stabilized zirconia is preferred as its thermal expansion is a better match with the thermal expansion of other materials used in the fuel cell. Stabilized zirconia is a standard product which can be made, for example, by mixing monoclinic zirconia with about 13 to about 17 mole percent of a stabilizer followed by firing at 1200° C. to 1750° C., cooling and crushing to a powder. The firing temperature affects the degree of shrinkage that occurs during subsequent firings, materials fired at a high temperature shrinking less than materials fired at a low temperature. It is preferable to use a mixture of two refractory materials which have been fired at different temperatures as this enables one to control the porosity of the resulting ceramic. That is, the more high temperature fired refractory material present, the higher the porosity will be. The mixture may be about 20 to about 50 percent low temperature fired refractory material and about 80 to about 50 percent high temperature fired refractory material. The high temperature refractory material should have a particle size of less than 100 mesh as larger particle sizes produce ceramics with rough textured surfaces which may interfere with subsequent processing. It should also have a particle size of greater than 500 mesh as too fine a refractory material may produce a ceramic which has too low an air diffusion rate. A preferred particle size distribution is about 60 to 75 weight percent in the 53 to 37 micrometer range and about 40 to 25 weight percent of less than 37 micrometer diameter particles.

While the composition may be prepared by mixing these six ingredients in any order, it is preferable to mix the dry powders together first, that is, the starch, cellulose, dispersant, and refractory material, and then to add the mixture of dry powder to a solution of the organic binder in water as this produces a more homogeneous composition.

After the composition has been prepared, it should be de-aired to prevent the formation of bubbles in the ceramic structure. This can be accomplished by forming the composition into a shape convenient for insertion into an extruder and pulling a vacuum on it, or by chopping up the composition and pulling a vacuum on the chopped-up pieces.

In the next step, the de-aired composition is formed into the desired shape. This can be accomplished by molding, extruding, or other processes. If a tube is to be formed which is plugged at one end, the plug is placed inside one end of the tube at this time. The plugs should be made of the same composition as the tube except that refractory material used in the plug composition should be material which was previously fired at a higher temperature than the refractory material used in the tube so that the plug will shrink less than the tube and a tight seal will form between the tube and the plug. Also, at this time a collar is placed around the other end of the tube. The collar should also be made of the same composition as the tube except that the refractory material in the collar composition should be material which was fired at a lower temperature than the refractory material used in the tube so that the collar will shrink more than the tube and form a tight seal between the tube and the collar. The ceramic paste shown in the drawings can also be placed around the collar at this time to hold the collar to the tube. The shaped composition is then positioned for firing. If the shape is a plugged tube, it is hung as shown in the drawings.

In the next step of this invention the shaped composition is fired to convert it to a ceramic. The firing temperature must be above the ceramic conversion temperature of the refractory material. If a mixture of refractory materials are used which have been fired at two different temperatures, the firing temperature of the shaped composition should be in between those two firing temperatures. The firing should proceed slowly and the temperature should increase step-wise so that the organic materials burn out slowly and do not damage the structure. A suitable firing schedule is to heat at 300° C. for two hours and then increase the temperature at the rate of 75° to 100° C. per hour to 800° C. The temperature is then increased at a rate of 100° to 150° C. per hour to the final firing temperature, where it is held for about 6 hours. The ceramic structure is then cooled and cut if necessary. To produce tubes which are used in high temperature solid oxide fuel cells, for example, the collar must be sawed off.

The following examples further illustrate this invention.

EXAMPLE 1

In this experiment, calcia stabilized zirconia was prepared by weighing out portions of calcium carbonate and monoclinic zirconia in the proportion of 15 mole percent calcium carbonate to 85 mole percent zirconia. The materials were wet milled in a ball mill which was rubber lined using radius zirconia cylindrical balls. After mixing, the material was dried in a glass tray in a hot recirculating air oven. The dry material was then slugged by pressing it into round discs which were 2 inches in diameter by ½ inch thick. Discs was calcined at two different temperatures, 1790° C. and 1400° C. for one hour each. Each batch of discs were then separately crushed in a jaw crusher to reduce the material to less than about ¼ inch in diameter. The materials were then separately pulverized in a shatter box using tungsten carbide elements as the crushing medium. (A shatter box is a ring and a disc enclosed in a shallow cylinder that gyrates when it is activated.) The crushing time in the shatter box was about 3 to 3½ minutes. After crushing, the materials were screened to determine their particle size distribution. A particle size distribution of about 60 to about 75 weight percent in the 53 to 37 micrometer range and about 25 to 40 weight percent of not more than 37 micrometer diameter particles is generally considered desirable. This particle size distribution is usually obtained automatically if the above procedure is followed. Powdered calcia stablized zirconia which had been calcined at the higher temperature was then mixed with powdered calcia stabilized zirconia which had been stabilized at the lower temperature in various proportions depending on the particular experiment. Compositions were prepared by mixing the calcia stabilized zirconia with a dispersant of starch, cellulose, and a solution of polyvinyl alcohol in water. The mixing was done in a V-cone blender for about one hour for the dry material only. The blended material was then added to a mixer kneader with the appropriate quantity of the polyvinyl alcohol solution. The material was kneaded until it became homogeneous and plastic. This is considered to be the most important processing step because the blending of the material into a homogeneous plastic state without contamination will produce straight, long, thin-walled tubes with one closed end.

The kneaded material was formed into a log and partially dried in a vacuum desiccator. The log was formed to fit the dimensions of the barrel of an extruder. The log was loaded into an extruder and extruded at pressures varying from 1300 to 2000 psi depending on the wall thickness of the tubing. The tubes were extruded onto a grooved carrier and were air dried in a controlled humidity enclosure until they were leather hard and stiff enough to handle. After this initial drying state, the tubes were air dried in a horizontal position in a humidity drying oven. Drying in the humidity drying oven under the following conditions assures a uniform drying rate and minimizes bending of the tubes.

| Time | Dry Bulb | Wet Bulb |
|---|---|---|
| 2 hours | above 40° C. | above 48° C. |
| 2 hours | at 70° C. | at 80° C. |
| 2 to 3 hours | at 110° C. | at 92° C. |

The dry extruded tubes were cut to specified lengths of 18 or 24 inches had a cylindrical collar was attached to the top end and an end plug was inserted into the bottom end of each tube. The zirconia materials prepared for the collar were designed so that the shrinkage rate during firing is much faster than that of the tube. Also, a high temperature ceramic adhesive made from the same family of zirconia materials was designed to sinter at a temperature lower than that of the collar or the tube. The plug inserted at the other end of the tube was designed so that it would shrink at a much lower rate than the tube. The combination of the high temperature ceramic adhesive and the low shrinkage insert contributes to a good shrink fit of the tube over the end plug.

The practice of maintaining stability of the tubes during firing was achieved by the quality of the ceramic adhesive and the shrink fit of the tube holding collar and, most important of all, the gradual burning and charring of the respective additives used as binders in the extrusion of the tubes.

The following table gives the composition of five tubes which were prepared and the properties of the tubes. All of the tubes were straight and met the requirements.

|  | 1 | 2 | 3 | 4 | 5 |
|---|---|---|---|---|---|
| Ratio of High to Low Temperature Zirconia | 90/10 | 90/10 | 80/20 | 75/25 | 70/30 |
| "LOMAR"* | .57 | .56 | .56 | .54 | 1.15 |
| Starch | 3.25 | 3.16 | 3.16 | 3.05 | 2.99 |
| Cellulose | .76 | 2.23 | 2.23 | 3.23 | 4.22 |
| Polyvinyl Alcohol | 1.89 | 2.08 | 2.08 | 2.50 | 2.64 |
| $H_2O$ | 7.56 | 8.33 | 8.33 | 10.03 | 10.54 |
| % $(ZrO_2)$ .85 $(CaO)$ .15 | 85.95 | 83.64 | 83.64 | 80.64 | 79.09 |
| % Porosity | 26.0 | 28.8 | 30.5 | 31.1 | 32.0 |
| % Shrinkage | 6.3 | 6.5 | 6.9 | 8.3 | 10.3 |
| Density | 3.72 | 3.55 | 3.65 | 3.49 | 3.48 |
| Specific Gravity | 5.03 | 5.05 | 5.09 | 5.00 | 5.05 |
| Firing temp., °C. | 1714 | 1699 | 1693 | 1711 | 1717 |
| Exothermic Peaks | no peaks | 1260° C. | 1355° C. | no peaks | 1400° C. |
| Endothermic Peaks | — | 1390° C. | 1450° C. | — | 1440° C. |
| Thermal Gravimetric Analysis | no weight loss after 450° C. | no weight loss after 460° C. | no weight loss after 465° C. | no weight loss after 465° C. | no weight loss after 465° C. |

*Dispersant sold by Diamond Shamrock under the Trade Designation "LOMAR"

We claim:
1. A composition comprising:
   (a) about 0.45 to about 5.5 percent of an organic water-soluble binder which has a thermal decomposition temperature of about 100° to about 500° C. and a viscosity of less than about 10,000 poises at 20° C.;
   (b) about 1.5 to about 4.0 percent of a starch which has a thermal decomposition temperature of about 250° to about 535° C., where the thermal decomposition temperature of said binder and said starch are at least about 50° C. apart;
   (c) about 1.5 to about 3.5 percent of cellulose;
   (d) about 0.5 to about 2.0 percent of a dispersant;
   (e) about 7 to about 11 percent of water; and
   (f) about 75 to about 89 percent of a high temperature refractory material.

2. A composition according to claim 1 wherein said binder is polyvinyl alcohol.

3. A composition according to claim 1 wherein said starch is cornstarch.

4. A composition according to claim 1 wherein said cellulose has a particle size less than about 200 mesh.

5. A composition according to claim 1 wherein said dispersant is ammonia neutralized condensed naphthalene sulfonic acid.

6. A composition according to claim 1 wherein said refractory material is stabilized zirconia.

7. A composition according to claim 1 wherein said zirconia is stabilized with calcia.

8. A composition comprising:
   (a) about 0.75 to about 4.0 percent of an organic water-soluble binder which has a thermal decomposition temperature of about 100° to about 500° C. and a viscosity of less than about 10,000 poises at 20° C.;
   (b) about 3.0 to about 3.5 percent of a starch which has a thermal decomposition temperature of about 250° to about 535° C., where the thermal decomposition temperature of said binder and said starch are at least about 50° C. apart;
   (c) about 2.0 to about 2.5 percent of cellulose;
   (d) about 0.75 to about 1.5 percent of a dispersant;
   (e) about 8 to about 10 percent of water; and
   (f) about 79 to about 85 percent of a high temperature refractory material.

9. A method of making a shaped ceramic comprising:
   (a) preparing a composition according to claim 1;
   (b) forming said composition into a shape; and
   (c) firing said composition at a temperature above its ceramic conversion temperature.

10. A method according to claim 9 wherein the starch, cellulose, dispersant, and refractory material are mixed then added to a solution of the binder in the water.

11. A method according to claim 9 wherein said composition is extruded into the shape of a tube of circular cross section.

12. A method according to claim 11 wherein a plug of said composition containing refractory material previously fired at a higher temperature is placed in one end of said cylinder and a collar of said composition containing a refractory material previously fired at a lower temperature is placed around the other end of said cylinder, and said cylinder is hung vertically from said collar during firing.

13. A method according to claim 9 wherein said refractory material is a mixture of a refractory material fired at two different temperatures and said extruded composition is fired at an intermediate temperature.

14. A method according to claim 9 including the additional step of de-airing said composition prior to firing it.

15. A method according to claim 9 wherein said composition is fired at slowly increasing temperatures.

16. A tube prepared according to the method of claim 9.

17. A method according to claim 9 wherein said binder is polyvinyl alcohol.

18. A method according to claim 9 wherein said starch is cornstarch.

19. A method according to claim 9 wherein said cellulose has a particle size less than about 200 mesh.

20. A method according to claim 9 wherein said dispersant is ammonia neutralized condensed napthalene sulfonic acid.

21. A method according to claim 9 wherein said refractory material is stabilized zirconia.

22. A method according to claim 9 wherein said zirconia is stabilized with calcia.

23. A method of making a ceramic tube sealed with a ceramic plug at one end comprising:
    (1) preparing a composition which comprises:
        (a) about 0.75 to about 4.0 percent of an organic water-soluble binder which has a thermal decomposition temperature of about 100° to about 500° C. and a viscosity of less than about 10,000 poises at 20° C.;
        (b) about 3.0 to about 3.5 percent of a starch which has a thermal decomposition temperature of about 250° to about 535° C., where the thermal decomposition temperature of said binder and said starch are at least about 50° C. apart;
        (c) about 2.0 to about 2.5 percent of cellulose;
        (d) about 0.75 to about 1.5 percent of a dispersant;
        (e) about 8 to about 10 percent of water; and
        (f) about 79 to about 85 percent of a high temperature refractory material;
    (2) de-airing said composition;
    (3) forming said composition into the shape of a tube;
    (4) inserting a plug of said composition containing refractory material previously fired at a higher temperature into one end of said tube and a collar of said composition containing a refractory material previously fired at a lower temperature around the other end of said tube;
    (5) hanging said tube vertically; and
    (6) firing said tube at a temperature above its ceramic conversion temperature.

24. A method according to claim 23 wherein the starch, cellulose, dispersant, and refractory material are mixed then added to a solution of the binder in the water.

25. A method according to claim 23 wherein said refractory material is a mixture of a refractory material fired at two different temperatures and said extruded composition is fired at an intermediate temperature.

26. A method according to claim 23 wherein said composition is fired at slowly increasing temperatures.

27. A tube prepared according to the method of claim 23.

* * * * *